May 16, 1967 J. R. ALBURGER 3,320,417
FLUORESCENT IMAGE-FORMING SCREEN
Original Filed Oct. 4, 1965 2 Sheets-Sheet 1
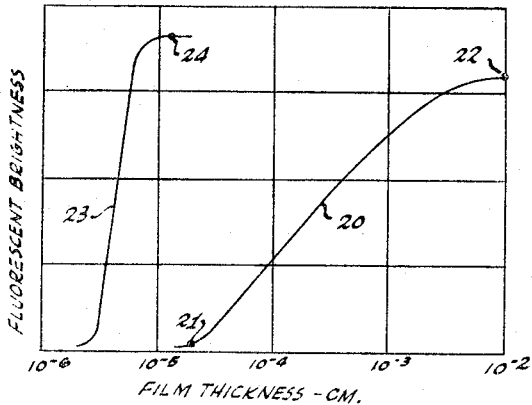
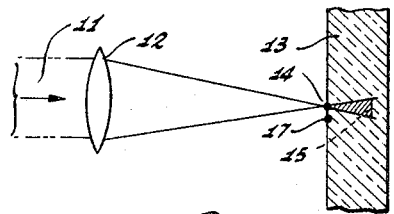
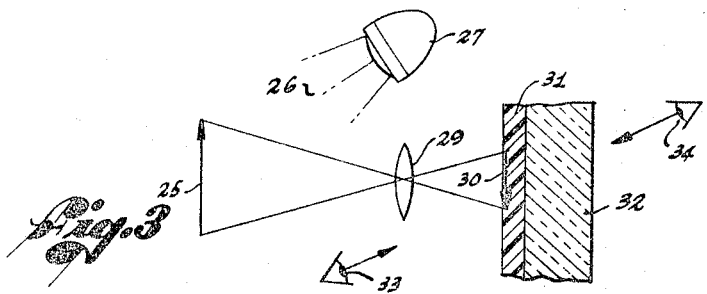
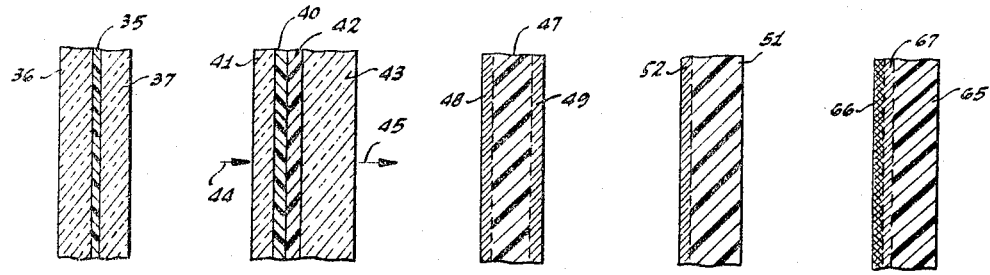
INVENTOR.
James R. Alburger May 16, 1967 J. R. ALBURGER 3,320,417
FLUORESCENT IMAGE-FORMING SCREEN
Original Filed Oct. 4, 1965 2 Sheets-Sheet 2

INVENTOR.
James R. Alburger

United States Patent Office 3,320,417
Patented May 16, 1967

3,320,417
FLUORESCENT IMAGE-FORMING SCREEN
James R. Alburger, 5007 Hillard Ave.,
La Canada, Calif. 91011
Original application Oct. 4, 1965, Ser. No. 492,674.
Divided and this application Mar. 8, 1966, Ser. No. 532,618
19 Claims. (Cl. 250—71)

The present application is a division of my copending application, Ser. No. 492,674, filed Oct. 4, 1965, for "Fluorescent Tracers," which latter application is a continuation-in-part of my application, Ser. No. 323,529, filed Nov. 13, 1963, for "Fluorescent Tracers," now abandoned, which previous application was a continuation-in-part of my application, Ser. No. 149,061, filed Oct. 31, 1961, for "Fluorescent Tracers," now abandoned, which last application was a continuation-in-part of my application, Ser. No. 82,374, filed Jan. 13, 1961, for "Fluorescent Penetrant Tracers," now abandoned.

The present invention relates to fluorescent display elements, or fluorescent projection screens, and the like, which are capable of forming high resolution fluorescent images responsive to an impressed fluorociginous or fluorescence producing radiation.

Flourescent image-forming screens of various kinds are well known. For the most part, such screens are used for the examination of X-ray images or for the production of shadow-graph effects with ultraviolet radiation. Most of the fluorescent image-forming screen materials which are presently known employ pigmented phosphors and are thus relatively opaque. Certain other fluorescent image-forming screens may be prepared by applying transparent fluorescent paint or lacquer-type material on a suitable substrate such as a white card or a transparent panel.

The previously known fluorescent screen compositions are not capable of providing a high resolution in fluorescent image formation, for reasons which will become more apparent from a reading of the following specification. In brief, pigmented phosphors are limited in their image-forming resolving power due to the particle structure of the phosphor. Also, pigmented screens do not provide suitable characteristics for applications where background projection is wanted. In the case of the so-called "transparent lacquer" or dyed plastic screens, the image-forming resolution is limited due to the inability of such screens to completely absorb the fluorociginous radiation which may be impressed as an image on the screen.

Numerous applications exist where there are requirements for high resolution displays of data or various kinds of images which can be viewed without the directional effects which are found in specular reflection of light. In addition, these various requirements may include conditions of rear-projection, front-projection or viewing under various levels of ambient illumination. Many of these requirements may be satisfied by means of a properly designed and utilized high resolution fluorescent screen.

This invention contemplates the use of so-called "transparent" or dyed fluorescent screens, and improvements thereof, for the production of high resolution fluorescent images. In the following specification, the terms "fluorescent screen" or "screen material" refer to dyed or transparent screens, liquid or plastic layers or films, as the case may be, as distinguished from fluorescent screens composed of pigmented phosphors.

It is, therefore, the principal object of the present invention to provide an improved high resolution image-forming fluorescent screen.

Another object of the invention is to provide a high resolution image-forming fluorescent screen which may be activated either by front or rear projection or by both.

Still another object of the invention is to provide a high resolution image-forming fluorescent screen which will convert ultraviolet images to visible light images.

A further object of the invention is to provide a high resolution image-forming fluorescent screen which is transparent and nonresponsive to ordinary visible light, while being absorbent and fluorescence-responsive to fluorociginous radiation.

A still further object of the invention is to provide multicolor fluorescent screens which are capable of producing fluorescent images which exhibit a plurality of controllable colors.

Still another object of the invention is to provide a multicolor fluorescent screen which is capable of providing stereoscopic anaglyphic fluorescent images.

These and other objects of the invention will become more apparent from the following description thereof when read in conjunction with the accompanying drawings, in which:

FIG. 1 is a diagrammatic representation, in cross-section, of a focused beam of fluorociginous radiation impressed on a fluorescent screen;

FIG. 2 is a chart illustrating the behaviour of thin films of dyed fluorescent materials with respect to absorption of ultraviolet radiation and fluorescence response;

FIG. 3 is a diagrammatic representation, in cross-section, of a fluorescent image being formed in a fluroescent screen;

FIG. 4 is a diagrammatic representation, in cross-section, of a fluorescent image-forming screen of the invention laminated between two supporting members;

FIG. 5 is a diagrammatic representation, in cross-section, of a fluorescent image-forming screen of the invention laminated between two optical filter elements;

FIG. 6 is a diagrammatic representation, in cross-section, of a fluorescent image-forming screen of the invention produced by dyeing the surfaces of a plastic panel;

FIG. 7 is a diagrammatic representation, in cross-section, of a fluorescent image-forming screen of the invention produced by dyeing only one surface of a plastic panel;

FIG. 8 is a diagrammatic representation, in cross-section, of a multi-layer fluorescent image-forming screen of the invention produced by dyeing a surface of a plastic panel;

Figure 9:
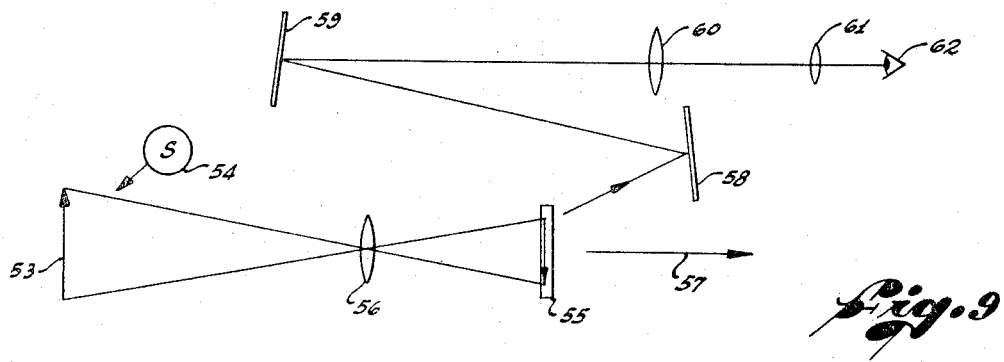
FIG. 9 is an optical diagram of an image converter apparatus of the invention adapted to permit "seeing" by ultraviolet light.

In the formation of a fluorescent image on a fluorescent screen by impressing an optical image of fluorociginous radiation onto the screen, the fluorociginous radiation enters the fluorescence-responsive surface of the screen and is first absorbed and then converted to a different wavelength of radiant energy which is emitted as the so-called fluorescence response. The resolving power of the screen for images having fine detail depends mainly on the degree of penetration of the fluorociginous radiation into the screen before it becomes fully absorbed.

For the purpose of this specification, the term "fluorociginous radiation" refers to any radiation such as short-wave ultraviolet, long-wave ultraviolet, blue or green light which is capable of exciting fluorescence response through a process of absorption and re-emission of radiant energy.

Referring now to FIG. 1, a beam of fluorociginous radiation 11, such as, for example, ultraviolet radiation in the range of 3600 A.U., is focused by a lens 12 onto the surface of a fluorescent screen 13, which is shown here in cross-section. When the lens is properly focused, the elemental image represented by beam 11 is formed as a microscopically small spot represented by point 14. As the focused beam of radiation enters the screen surface 13, it tends to diverge to form a cone-shaped beam of radiation which is gradually absorbed by the screen material. After the beam penetrates to some particular depth in the screen, as indicated by the line 15, the fluorociginous radiation is absorbed substantially to entirety, and, of course, a fluorescence response to the thus-absorbed fluorociginous radiation occurs in the conical zone as indicated. This fluorescence emission may have any desired characteristic color depending on the choice of fluorescent ingredients in the screen.

It will be seen that the shape of the conical zone of fluorescence emission depends on the aperture of the focusing lens 12 and on the focal length of this lens. It will also be seen that if a second image point 17 is relatively close to image point 14, the cone-shaped zone of fluorescence emission arising therefrom could overlap the zone of fluorescence from image point 14, the amount of this overlap depending on the depth to which the fluorociginous radiation penetrates into the screen before it is completely absorbed.

As a rule of thumb, and for practical purposes, it can be said that the image resolution capability of a fluorescent screen is dimensionally about equal to the effective depth of penetration of the fluorociginous radiation. For example, if it is desired that the fluorescent screen be capable of resolving two image points which are separated on the screen surface by a distance of .1 millimeter, then the screen must be capable of absorbing substantially all of the image-forming fluorociginous radiation within a depth penetration of less than .1 millimeter.

Referring now to FIG. 2, there is illustrated here a characteristic curve 20 of fluorescence response plotted as a function of the thickness of a fluorescent film. The behaviour of thin films of fluorescent liquids or plastic materials has been described in detail in my copending application, Ser. No. 492,674, and in my now issued Patent No. 3,107,298. In brief, it has been discovered that for each solution of fluorescent dye or so-called fluorescent sensitizer there exists a critical film thickness at which a transition of fluorescence response occurs. Below this critical film thickness fluorescence response diminishes to substantially zero, as shown by point 21 on the toe of curve 20, while above the critical film thickness, the fluorescence response increases to a maximum level as shown by point 22 on the shoulder of curve 20.

Inasmuch as fluorescent emission can result only through a process of absorption and conversion of fluorociginous radiation, it is apparent that the thickness of the fluorescent film corresponding to point 22 is the thickness at which substantially all of the fluorociginous radiation is absorbed. It has been pointed out in the above-mentioned application, Ser. No. 492,674, and in my Patent No. 3,107,298, that the entire response transition curve, as illustrated by curve 20, can be shifted to the left on the chart by increasing the concentration of fluorescent sensitizer in the material under test, or it may be shifted to the right by reducing the concentration of the fluorescent sensitizer. If the transition curve is shifted to the left, as illustrated by curve 23, it tends to become steeper so that the transition from toe to shoulder occurs over a relatively narrow range of film thicknesses.

In the past, fluorescent liquid or dyed plastic compositions have almost invariably employed concentrations of fluorescent dye on the order of a fraction of a percent, while in a few instances dye concentrations on the order of two percent have been found practical. The reason for this limitation in previous usage of fluorescent substances appears to be connected with the assumption that the useful efficiency of most fluorescent dyes is lost above a certain critical concentration which may be in the range of 1 to 3%. It is true that fluorescent brightness response of a dyed fluorescent material usually diminishes rapidly at dye concentrations greater than a few percent, and it is also true that the usage of fluorescent dyes in the prior art has been limited to concentrations less than about 15 grams per pint (or about 3.15 percent) such that the threshold of fluorescence response, as illustrated by point 21 occurs at film thicknesses greater than about 250 millimicrons.

When a typical fluorescent sensitizer material is employed in a concentration of about 15 grams per pint, or more, as described and claimed in my above-mentioned copending application, Ser. No. 492,674, the threshold of fluorescence, as indicated by point 21, may occur at a film thickness of about 250 millimicrons or less, and the shoulder of the response transition curve, as indicated by point 22, may occur at a film thickness of about 100,000 millimicrons or .1 millimeter. Thus, it is seen that in order to achieve a substantially complete absorption (and fluorescent conversion) of fluorociginous radiation within a depth of penetration of a layer of dyed fluorescent material which is smaller than .1 millimeter, a concentration of fluorescent sensitizer dye must be employed which is greater than about 15 grams per pint. As was pointed out in my above-mentioned copending application, the unit of measure, grams per pint, is utilized for the reason that it is numerically about equal to pounds per 55 gallon volume, thus permitting laboratory measurements to be readily transcribed into production quantities of material.

By use of efficient fluorescent sensitizers, employed in relatively high concentrations in a fluorescent screen material, it has been found possible to shift the transition characteristic of absorption and fluorescence emission to the left on the chart of FIG. 2 so as to provide a substantially complete absorption of fluorociginous radiation within a film thickness of about 200 millimicrons, as illustrated by point 24 on curve 23. Under such a condition, a fluorescent image converter screen would have a theoretical resolving power of $2 \times 10^{-4}$ mm. This corresponds to a resolution capability for images having detail on the order of 5000 lines per millimeter. Such a resolving power is somewhat better than the image resolving capability of an average high quality lens.

Referring now to FIG. 3, an object 25 is irradiated by a fluorociginous radiation 26 from a source 27 which may be a filtered blacklight or even the sun. Reflected radiation from the object 25 is focused by a lens 29 to form an image 30 on a fluorescent image-forming layer 31, shown here in cross-section, which is supported on a transparent substrate 32, which may be a sheet of glass or clear plastic. The image 30 of fluorociginous radiation enters the layer 31 and is converted by fluorescence to form a visible image which can be viewed from the front by an observed in position 33 or from the rear by an observer in position 34. Ordinary visible light which does not excite fluorescence response in the layer 31 passes through the layer and does not form any visible images.

By employing an appropriate selection of fluorescent sensitizer dyes and color-former dyes, as described in my copending application, Ser. No. 492,674, any desired visible color of fluorescence may be obtained. In some cases, it may be desirable to produce a green fluorescence emission from the screen, for the reason that this color corresponds to the peak of the visual acuity curve for the average human eye. In other cases, it may be desired to produce a blue or red fluorescence, as for example, where special color effects are wanted.

Not all fluorescent dyes are capable of providing the desired absorption and conversion effects as described above; however, there is a wide choice of available materials, any of which is suitable for such usage. The ability of a given fluorescent dye or fluorescent sensitizer composition to provide the desired level of dimensional sensitivity, or absorption and conversion of fluorociginous radiation within a depth of penetration less than .1 millimeter can be quickly and easily evaluated by means of my so-called Meniscus Method of measurement, which is described in detail in my Patent No. 3,107,298.

Various arrangements and configurations of the fluorescent screen of this invention may be employed. Referring now to FIG. 4, there is here illustrated in cross-section an arrangement where an image-forming fluorescent layer 35 is laminated between two transparent members 36 and 37.

In FIG. 5, there is illustrated in cross-section an arrangement in which an image-forming fluorescent green layer 40 is laminated between an ultraviolet transmitting filter 41 and a green transmitting filter 42, all of these layers being mounted on a transparent support member 43. Fluorociginous radiation 44 enters the sandwich of layers through filter 41, and the green radiation 45 from the resultant fluorescent image is observed through the green filter 42. This arrangement acts to exclude the transmission of visible light. It is useful as an image-forming reticle in a microscope eyepiece where visible light may be projected through the microscope optics along with fluorociginous radiation, and where such unwanted visible light might tend to obscure the desired fluorescent images.

The fluorescent image-forming layers 13, 31, 35, and 40, described above, may be in the form of liquid or plastic material in which there has been dissolved a suitable fluorescent sensitizer material to a concentration of at least about 15 grams per pint, and less than the limit of solubility thereof. A wide variety of liquid materials may be utilized in the form of a liquid cell in which two transparent plates are spaced close together and sealed around their edges to retain a layer of fluorescent liquid between the transparent plates. Of course, where front projection is wanted, only one of the plates need be transparent. Many kinds of liquids may be employed, including glycols, glycol ethers, ketones, alcohols, alkylphenols, ethoxylated alkylphenols, plasticizer liquids, water, and many others.

A wide variety of plastic materials may be utilized for the construction of a fluorescent screen of the invention, it being only necessary to dissolve a suitable fluorescent sensitizer in the plastic material to a concentration of at least about 15 grams per pint, and less than the limit of solubility thereof. Many plastic materials may be found suitable for the purpose, and I do not restrict the invention to any particular plastic material or materials. Some plastic or resinous materials may be preferred over others due to their optical clarity or because they provide better efficiency of image conversion, or they may provide special properties which are wanted, such as resistance to solvents or resistance to heat, etc. Some of the better plastic materials include polyester, epoxy, vinyl, alcohol modified urea formaldehyde, alcohol modified melamine formaldehyde, acrylic and styrene resins.

Many of the useful resinous or plastic materials may be handled by dissolving the resin in a suitable solvent. An appropriate fluorescent sensitizer ingredient (or ingredients) may then be added to the required concentration, and the liquid may be cast in a thin layer on a suitable substrate and allowed to dry. Other useful resinous materials may be treated by preparing them in the form of a melt containing the required concentration of fluorescent sensitizer. The melted material may be cast on a substrate as a surface layer, or it may be laminated between two support members, at least one of which is transparent. Still other useful resinous materials may be prepared as two-component mixtures, one component being a catalyst. The prepared fluorescent mixture, containing a catalyst and the required concentration of fluorescent sensitizer and color-former, may be coated on a substrate or laminated between two support members to form a fluorescent image converter screen.

Certain plastic materials, notably vinyl plastic or cellulose acetate plastic materials, may be obtained in the form of clear colorless sheets. These sheets may be treated with a suitable fluorescent sensitizer composition by a staining process so as to impregnate the surface of the plastic material. The thus-dyed plastic material would exhibit a structure as illustrated in cross-section in FIG. 6. Here, a panel of clear plastic 47 has been dipped in a fluorescent dye bath so that the fluorescent sensitizer dye has penetrated into the plastic to form zones of dyeing 48 and 49. In this configuration, it is important that the zones 48 and 49 extend to a depth commensurate with the critical dimension required for substantially complete absorption of fluorociginous radiation. Also, it is important that the dye bath shall provide an equivalent final concentration of fluorescent sensitizer dye in the zones 48 and 49 of at least about 15 grams per pint volume of the plastic material.

Referring now to FIG. 7, there is here illustrated, in cross-section, a layer of clear plastic material 51 which has been dyed with a fluorescent sensitizer on one side only. By masking off one side of the clear plastic sheet, the dyeing process has been allowed to proceed on one side only so as to produce only the one dyed surface layer or zone 52. This method of dyeing, and the resultant screen, has the advantage that a minimum of unwanted absorption of the fluorescent emission of the image is obtained when the screen is employed in the mode of rear projection.

Referring now to FIG. 8, there is here illustrated, in cross-section, a layer of clear plastic material 65 which has been dyed on one side only with a dye bath containing a plurality of sensitizer dyes and color-former dyes. In this dyeing, the sensitizer may consist of two components, such as a blue component and a red or green color-former component. By means of a proper selection of the dye or sensitizer components, a unique dyeing effect can be obtained wherein the two components diffuse into the plastic layer at different rates, the blue component usually exhibiting a much more rapid rate of diffusion than red or green dye components. The result of the dyeing, therefore, is that a double layer of dye colors is produced. For example, a surface zone 66 is produced which contains both the blue sensitizer and a color-former dye which may be green, red, or some other color, as selected. Beneath this film of colored dyeing, there is a zone of dyeing 67 which contains only the blue sensitizer. When an image of fluorociginous radiation is impressed on the front surface of the screen represented by FIG. 8, the resultant visible image is seen as a red or green fluorescent color, as the case may be. If, on the other hand, the image of fluorociginous radiation is impressed on the rear of the screen, through the plastic substrate, the resultant visible image is seen as a blue fluorescence.

Another method for producing a bi-color image-forming screen is to coat the opposite surfaces of a thin transparent substrate with differently colored fluorescent plastic coater compounds containing sensitizer dyes in the required concentration in accordance with the invention. Alternatively, a double dyeing operation may be performed without depending on the formation of the double dye layer as described above. In the event that surface coaters or double dyeing techniques are employed, a wide range of color combinations may be obtained. For example, one side of the screen may be made to produce brilliant red images, while the other side produces bright green images.

Double layer dyeings or bi-color dyed or coated screens, as described above, may be utilized for the production of multi-colored images, where two color-separation images are projected in super-position, one from the front and one from the back of the screen. Another useful application of such a screen is the production of three-dimensional stereoscopic anaglyphic images, where the two differently colored and differently dimensionally disposed images are viewed through colored glasses. One eye, looking through a red filter, would see the red component, if such is employed, while the other eye, looking through a blue filter, would see the blue component of the fluorescent image.

The above-described double layer dyeing may be also adapted to provide a three-color effect for the production of "natural" color images, as will be described in Example 5 below.

Any of the above-described screens may be employed in various ways and in various optical configurations. For example, ultraviolet images may be focused on a large screen by means of a suitable projector arrangement. Such a screen may then be viewed by a large audience. In this mode of usage, the projector may be a conventional film or slide projector employing a source of fluorociginous radiation such as ultraviolet light, or it may be a flying spot scanner in which a narrow beam of ultraviolet radiation is made to scan through a raster on the fluorescent screen of the invention, the intensity of the incident flying spot being modulated by a suitable light valve arrangement. It is even possible to utilize a laser beam which provides a fluorociginous radiation, and the laser beam may be made to yield a scanning raster by means of a mirror galvanometer or by use of a suitable electrorestrictive cubical-crystal deflection technique.

Other modes of usage may include the insertion of a small image-forming screen as a reticle in the image plane of a microscope or telescope eyepiece. Still another mode of usage is illustrated in FIG. 9, which is a diagrammatic representation of a viewer which permits "seeing" by ultraviolet light. An object 53 is irradiated with fluorociginous radiation from a source 54. The reflected radiation, which may also include visible light, is focused on an image converter reticle 55 of the invention by means of a lens 56. The visible portion of light passes through the reticle 55, as indicated by arrow 57, and forms no image in the reticle. The ultraviolet portion of the impressed radiation forms a fluorescent image on the fluorescent reticle 55, this image providing radiation of visible light in all directions. A system of mirrors 58 and 59, an erector lens 60, and an eyepiece 61 complete the optical setup.

By virtue of the fact that the fluorescent image from reticle 55 radiates in all directions, the mirror 58 can be offset from the optical axis of lens 56 so that nonfluorociginous radiation does not strike the mirror 58, while at the same time, light from the fluorescent image is reflected into the viewing optical system. An observer 62 looking into the eyepiece 61 sees an erect image of the object 53, but only the reflected portions thereof which are derived from ultraviolet radiation. Fluorescent images produced in a viewer of this kind may yield surprising and unexpected effects. For example, exterior scenes in bright sunlight focused on a fluorescent green converter reticle or screen of the invention will exhibit brightness characteristics of different "colors" which are quite different than those observed in ordinary light, the most pronounced effect being that bright yellow colors usually appear to be a dead black in the ultraviolet viewer. One quite surprising phenomenon which occurs in the use of the above-described ultraviolet viewer is that despite the fact that the fluorescent image consists of various shades of a substantially monochromatic radiation, or at least a band of wave lengths which is the same in all parts of the image, a distinct sensation of color variations in different parts of the image is observed. It is possible that this sensation of color is due to an optical illusion in the response of the eye in viewing the fluorescent image.

Figure 10:
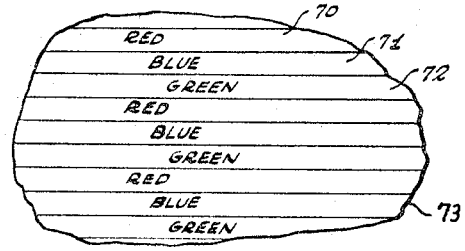
FIG. 10 is a diagrammatic representation, in plan view, of a tri-color line pattern of fluorescent screen elements of the invention.

Various adaptations of the fluorescent screen materials of the invention may be made in which the materials are applied on a substrate in the form of multi-color line or dot patterns. FIG. 10 illustrates, in plan view, a multi-color screen arrangement in which a series of narrow parallel lines 70, 71, and 72, having the three additive primary fluorescent colors, red, blue-violet, and green, are printed on a transparent substrate 73. If a suitable mask containing parallel slits is placed adjacent to the above-described line-pattern screen, and if through this mask appropriate images of fluorociginous radiation are projected at the proper angular dispositions, there will be yielded tri-color fluorescent images. A similar result might be obtained by utilizing a lenticular embossing on the back surface of the transparent substrate in a manner similar to the well-known Keller-Dorian process of color photography.

Figure 11:
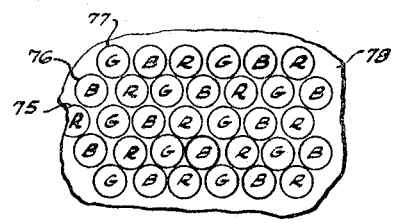
FIG. 11 is a diagrammatic representation, in plan view, of a tri-color dot pattern of fluorescent screen elements of the invention.
Figure 12:
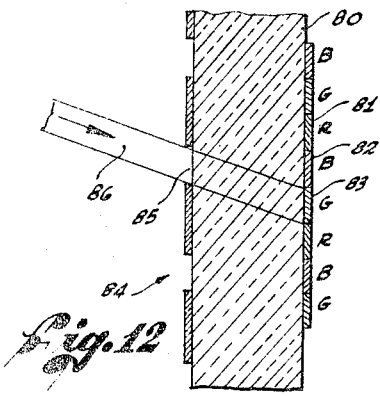
FIG. 12 is a diagrammatic representation, in cross-section, of an aperture mask employed in conjunction with a multi-color screen of the invention.

Another adaptation of the screen materials of the invention is illustrated in FIG. 11, wherein there is shown, in plan view, a dot-pattern of fluorescent dyed plastic materials of the invention printed on a transparent substrate. The red dots 75, the blue dots 76, and the green dots 77 are disposed in a triangular pattern on a substrate 78 in a manner similar to the disposition of the dots of luminous phosphors which are printed or deposited on the inner face of conventional color-television picture tubes. Multicolored images are obtained by projecting fluorociginous images through a dot-aperture mask in a manner also similar to that employed in the above-mentioned color television picture tubes, except that here fluorociginous radiation is employed instead of an electron beam.

The dot-pattern or line-pattern mark, as the case may be, may be printed on the back surface of the transparent substrate, as illustrated in FIG. 2. Here, there is shown in cross-section, a transparent substrate 80 on which is printed line or dot elements 81, 82, and 83 of screen materials of the invention to provide three fluorescent additive primary colors. A mask 84 is printed on the opposite surface of the substrate 80, providing apertures, one of which is shown at 85, through which the fluorociginous radiation may be projected onto the fluorescent elements 81, 82, and 83. The angle of the projected beam of fluorociginous radiation 86 in passing through an aperture 85 determines which of the colored elements is excited to a fluorescence response, and likewise the color rendition of the screen is thus determined.

Figure 13:
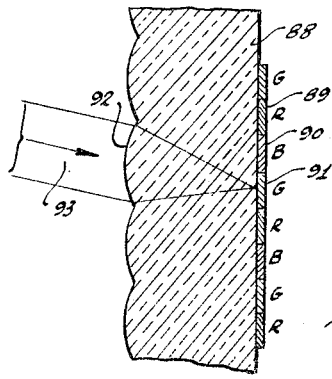
FIG. 13 is a diagrammatic representation, in cross-section, of a lenticular-backed support member for a multi-color screen of the invention.

The so-called Keller-Dorian arrangement for projecting the fluorociginous image onto selected fluorescent elements is illustrated in FIG. 13. Here, shown in cross-section, is a lenticular-backed transparent substrate 88 on which are printed line-pattern elements 89, 90, and 91 of screen materials of the invention to provide three additive fluorescent primary colors. A given lenticular area 92 on the substrate backing will act as a lens and will focus an impressed beam of fluorociginous radiation on a given line element 91 as shown. The above-described dot or line masks and lenticular film configurations are, of course, not new, except insofar as the fluorescent screen elements of this invention may be employed to provide a high efficiency of fluorescence conversion in the formation of fluorescent images.

It has been found that certain dye materials, notably derivatives of benzophenone, act as ultraviolet absorbers without emitting any fluorescent radiation, at least in the visible wave band. Such dye materials are in most cases transparent to ordinary light, yet they will provide substantially complete absorption of fluorociginous radiation in thin films provided they are present in a carrier vehicle, such as a plastic resin, to a sufficient degree of concentration, greater than about 15 grams per pint.

A large number of ultraviolet absorbing chemicals or dyes are available, a representative example being tetramethyldiaminobenzophenone (or Michler's ketone), many of which may be dissolved in a plastic or ink vehicle for use in printing as an ultraviolet mask for the above-described usage. Such chemicals or dyes are quite common, and are presently employed extensively in wax coatings for potato-chip bags, lacquer coatings for windows, or in plastic sunshades of various kinds.

A colorless ultraviolet absorber may, therefore, be used as a mask material for printing dot-pattern or line-pattern masks as described above. This permits a front-projection of tri-color images if desired, and it permits the use of tri-color image-forming screens which are transparent to visible light. Such transparent screens, and other transparent screens of the invention, may be used for the display of data or picture information in an aircraft windshield or in other locations where it is desired to superimpose a fluorescent image on another data display.

The fluorescent screen materials of the invention are advantageous in that they provide high resolution images, where the resolving power is limited mainly by the precision of the image projection optics, while at the same time the screens themselves are transparent and non-diffusing in character with respect to ordinary light. This latter feature permits the use of the screen and fluorescent images derived therefrom under conditions of high levels of ambient illumination. The effective see-ability of a fluorescent image produced on a screen of the invention depends on the brightness contrast within the image, and this brightness contrast can be made substantially independent of ambient illumination merely by placing a non-reflecting surface or "black hole" behind the image-forming screen. It will be understood that similar results cannot be achieved by the projection of ordinary visible light images on a conventional "white" or reflecting screen.

Ordinary reflecting screens reflect not only the visible images projected thereon, but they also reflect, more or less diffusely, any ambient light which is present. In order for an ordinary reflective screen to present a projected image with good see-ability, it is necessary that the screen brightness, due to ambient illumination, be less than the brightness of the darkest area of the projected image, at least by a factor of 10. Limitations such as this, with respect to projected image intensity and ambient light level, are not found in the usage of screens of this invention when they are properly employed as described above.

In the following examples, a wide variety of fluorescent sensitizer dyes and color-former dyes may be employed, the examples given being representative of the many materials which may be selected. Among the many fluorescent dyes or sensitizers which may be used are those which are described and claimed in my copending application, Ser. No. 492,674. The designations for the dyes used in the examples below are Color Index designations, as listed in the Color Index (2nd ed. 1956, vols. 1 to 4), published by the Society of Dyers and Colourists, Dean House, Picadilly-Bradford, Yorkshire, England; the American Association of Textile Chemists and Colorists; and Lowell Technological Institute, Lowell, Massachusetts, U.S.A.

*Example No. 1.*—A fluorescent plastic composition for use as a surface coating was prepared having the following percentage composition:

| | Percent |
|---|---|
| Fluoranthene | 14 |
| C. I. Fluor. Brightening Agent 75 | 1.5 |
| Polyester resin (Laminac 4110, trademark, American Cyanamid Corp.) | 84.5 |

To the above resin composition was added as a catalyst, 80 cc. per gallon of methyl ethyl ketone peroxide. The mixture was applied in a thin film between two glass plates, and cured to a hard material having a bright green fluorescence and having an image resolving power of about 500 millimicrons or 2000 lines per millimeter. A grainless fluorescent screen was thus provided, capable of converting to visible light ultraviolet images focused thereon. This screen may serve as a converter reticle, and is useful in various applications requiring the visual observation of ultraviolet images; e.g., microscopes, or converter cells in communication systems employing modulated ultraviolet radiation. In the above formulation, an epoxy resin catalyzed by an appropriate amine catalyst may be substituted for the polyester resin.

*Example No. 2.*—A fluorescent liquid having the following formulation was prepared:

| | |
|---|---|
| C.I. Fluor. Brightening Agent 26, oz. | 8 |
| Water to make 1 gallon. | |

The above formulation is a fluorescent blue liquid which may be used in a liquid cell as an image-forming reticle. It provides a colorless image converter screen having an image resolving power of about 200 millimicrons or 5000 lines per millimeter. The liquid of the above formulation may also be used as a leak tracer for water solutions as used in pipe lines or various kinds of tanks. Its fluorescent color may be shifted to a bright green by the addition of a green color-former, such as C.I. Acid Yellow 73 (Fluorescein).

*Example No. 3.*—A fluorescent liquid having the following formulation was prepared:

| | Percent |
|---|---|
| C.I. Acid Red 52 | 7 |
| C.I. Fluor. Brightening Agent 55 | 7 |
| Nonylphenol | 86 |

The above formulation is a fluorescent red liquid which may be used in a liquid cell as an image-forming reticle to provide fluorescent red images. It provides an image resolving power in excess of 200 lines per millimeter. The liquid of the above formulation may also be used as a marking ink or as an ink in ball-point pens, or in typewriter ribbons.

*Example No. 4.*—A fluorescent liquid dye bath having the following formulation was prepared:

| | | |
|---|---|---|
| C.I. Fluor. Brightening Agent 68 | grams | 7.5 |
| C.I. Fluor. Brightening Agent 75 | do | 7.5 |
| Methylene chloride | oz | 4 |
| Perchloroethylene | oz | 12 |

The above formulation is a fluorescent green liquid which may be used as a dye bath for staining clear vinyl plastic sheets to a green fluorescence. Vinyl plastic has a strong affinity for the fluorescent dyes of the formulation, and, therefore, the formulation may be diluted to a considerable degree with a 25%–75% mixture of methylene chloride and perchloroethylene, and the dyes will still be absorbed into the surface of the plastic sheet to provide a relatively high localized concentration of dye. This same formulation may be used for dyeing cellulose acetate plastic provided the proportion of the methylene chloride ingredient is reduced slightly so as to prevent an excessive softening of the plastic surface. A satisfactory dyeing is obtained by dipping vinyl plastic in the above dye bath for about 10 to 20 minutes at room temperature. The fluorescent color may be changed from green to blue by omitting the C.I. Fluor. Brightening Agent 75 ingredient. In all cases, the dyeing produces a dyed layer on the surface of the plastic sheet which exhibits a fluorescent image resolving power greater than 10 lines per millimeter. The above dye bath formulation may be used in a manner such that only one side of a plastic sheet is dyed, with the result that the dyed layer exhibits a bright green fluorescence when irradiation is from the front side; whereas, the fluorescence is a bright blue when ultraviolet irradiation is from the rear side. Various liquids may be substituted for the perchloroethylene in the above formulation, provided that such substituents are relatively inert in their solvent power on the plastic material being dyed. Various alcohols, glycols, or glycol-ethers may be employed for this purpose. Also, various liquids may be substituted for the methylene chloride of the formulation, so long as they have a relatively strong solvency for the plastic material being dyed. An example of a liquid substituent which is suitable for dyeing vinyl plastic materials is N-methyl-2-pyrrolidone.

*Example No. 5.*—A fluorescent liquid dye bath having the following formulation was prepared:

C.I. Fluor. Brightening Agent 68 _____grams__ 9.5
C.I. Basic Violet 10 _____do____ 9.5
Methylene Chloride _____oz__ 4
Isopropanol to make 1 pint.

The above formulation is a fluorescent red liquid which may be used as a dye bath for staining clear vinyl plastic sheets to a red fluorescence, yielding an image resolving power greater than 100 lines per centimeter. One surface of a vinyl plastic sheet was dyed with the above liquid by masking and dipping for 10 minutes at room temperature. The dyed sheet was rinsed in isopropyl alcohol and dried. Examination under long wave ultraviolet light showed that the front surface, when irradiated, produced a bright red fluorescence, while irradiation through the undyed substrate produced a bright blue fluorescence. A thin coating of micropulverized zinc orthosilicate suspended in a solution of vinyl plastic in ethyl-amyl-ketone was applied to the undyed surface of the plastic sheet. After the zinc orthosilicate coating was dry, it was found that this surface emitted a bright green fluorescence under irradiation by short wave ultraviolet radiation in the range of 2537 A.U. There was thus provided a dyed and coated panel which was capable of fluorescing in three separate and distinct colors depending on the wave length of the irradiation and the orientation of the panel with respect to the source of radiant energy.

*Example No. 6.*—A fluorescent ink composition was prepared having the following formulation:

C.I. Flour. Brightening Agent 58 _____grams__ 15
C.I. Basic Violet 10 _____do____ 6
C.I. Basic Red 1 _____do____ 3
Vinyl Plastic Powder _____oz__ 4
Isophorone to make 1 pint.

The above ingredients were blended together until fully dissolved to form a viscous fluid. The formulation provides a fluorescent ink which may be used in letterpress printing on transparent vinyl sheet material, the thus-printed ink films providing efficient absorption and conversion of ultraviolet radiation to visible light of a red color within film thicknesses smaller than .01 millimeter. The color of the above ink may be shifted to a fluorescent green by omitting the violet and red ingredients and substituting C.I. Fluor. Brightening Agent 75. The color of the ink may be shifted to a bright fluorescent blue by omitting all dye ingredients except the C.I. Fluor. Brightening Agent 58. Transparent plastic panels printed with line or dot patterns using the above-described ink colors may be employed for the production of tri-color fluorescent images.

*Example No. 7.*—A high resolution transparent double layer fluorescent screen was prepared by applying a coating of the following formulation to one face of a sheet of glass:

Epoxy resin (with catalyst) _____pint__ 1
Fluoranthene _____grams__ 60
C.I. Fluor. Brightening Agent 75 _____do____ 6

The above fluorescent liquid was poured on the glass panel and allowed to drain off, leaving a film of resin about .001 cm. thick which exhibited a brilliant green fluorescence under ultraviolet excitation. The coated plate was warmed gently in a dust-free oven until the epoxy film was cured to a hard condition.

The following formulation was then pepared:

Epoxy resin (with catalyst) _____pint__ 1
C.I. Fluor. Brightening Agent 68 _____grams__ 20

The above liquid, which has a bright blue fluorescence, was poured onto the cured epoxy-coated surface of the glass plate and a second glass plate was placed over the puddle of liquid epoxy material. The two plates were then pressed together to form a sandwich layer of liquid resin, in which the film of fluorescent blue liquid was about .001 cm. thick, and the assembly was warmed gently in an oven until the layer of epoxy material was cured to a hard condition.

The thus-first-prepared double layer fluorescent screen was found to produce bright blue fluorescent images when ultraviolet images were impressed on the "blue" side, while bright green fluorescent images were produced when ultraviolet images were impressed on the "green" side.

A second high resolution fluorescent screen was prepared by dipping a panel of clear vinyl plastic for about 15 minutes in a liquid having the following formulation:

Methylene chloride _____pint__ ¼
C.I. Basic Violet 10 _____grams__ 4
C.I. Fluor. Brightening Agent 58 _____do____ 15
Isopropanol to make 1 pint.

After staining in the above formulation, the vinyl plastic panel was rinsed in isopropanol and was dried. The thus-dyed panel, which was found to have a bright red fluorescence, was laminated between two glass plates using a clear epoxy cement (with catalyst), one of the glass plates being clear, the other being made of a "black" glass.

The thus-prepared "red" screen was positioned in front of a concave spherical mirror in such a way that the "clear" side of the screen sandwich faced toward the concave mirror, and in a position such that a real image of the "red" screen was produced in space beside the screen assembly. The first prepared double-layer fluorescent screen was then placed in the image plane of the real image derived from the "red" screen, in such a way that the "green" side of the screen faced toward the concave mirror.

Ultraviolet images from three different sources were then projected onto the three screen surfaces, and it was found that the three resulting fluorescent images, red, blue, and green, respectively, became superimposed at the aerial image plane of the concave mirror. It was found that the thus-produced composite image could be viewed from any angle within about 45° from the axis of the concave mirror, and the fluorescent images appeared to stand out clearly against a black background, being visible even under conditions of relatively high ambient illumination. It was found that the above arrangement of three fluorescent screen surfaces could be excited to form fluorescent patterns by projecting thereon narrow pencil-beams of ultraviolet radiation.

Although the invention has been described with reference to particular embodiments thereof, it will be understood that various changes may be made therein without departing from the spirit of the invention or the scope of the appended claims.

I claim:
1. A high resolution fluorescent display element comprising a fluorescent layer responsive to optical images of fluorescence-producing radiation, said fluorescent layer comprising a carrier for a fluorescent sensitizer and at least one fluorescent sensitizer dissolved in said carrier, said sensitizer being selectively used singly and in combination and being present in said carrier within the range of proportional concentrations of from at least about 15 grams per pint up to the limit of solubility of said sensitizer, whereby there is provided substantially complete absorption of said fluorescence-producing radiation, and conversion, and fluorescent emission, within a surface film thickness of said layer of less than about .1 millimeter.

2. A high resolution fluorescent display element in accordance with claim 1 in which said carrier is a fluid adapted to dissolve said fluorescent sensitizer.

3. A high resolution fluorescent display element in accordance with claim 1 in which said carrier is a plastic resin adapted to dissolve said fluorescent sensitizer.

4. A high resolution fluorescent display element in accordance with claim 1 in which said carrier is a polymerized resin adapted to dissolve said fluorescent sensitizer.

5. A high resolution fluorescent display element in accordance with claim 1 in which said fluorescent layer is a coating of sensitizer-containing carrier on a transparent substrate.

6. A high resolution fluorescent display element in accordance with claim 1 in which said fluorescent layer is laminated between transparent supporting members.

7. A high resolution fluorescent display element in accordance with claim 1 in which said fluorescent layer is laminated between two supporting members, at least one of which comprises a spectral filter adapted to transmit a fluorescent emission from said fluorescent layer.

8. A high resolution fluorescent display element in accordance with claim 1 in which said fluorescent layer is an impregnation of said fluorescent sensitizer in the surface of a resinous carrier material.

9. A high resolution fluorescent display element in accordance with claim 1 in which said fluorescent layer is an impregnation of at least two differently colored sensitizer dyes, wherein the said impregnation of fluorescent sensitizer dyes is a double layer providing at least two different fluorescent colors on opposite sides of the said impregnated double layer.

10. A high resolution fluorescent display element in accordance with claim 1 in which said fluorescent layer comprises a multi-color pattern printed on the surface of a transparent substrate, said multi-color pattern being adapted to respond selectively in its fluorescent color to a plurality of different impressed fluorescence-producing images.

11. A high resolution fluorescent display element in accordance with claim 1 in which said fluorescent layer is mounted in juxtaposition with a substantially nonreflective backing material.

12. A high resolution fluorescent display element in accordance with claim 1 in which said fluorescent emission is adapted to be viewed from the side of said fluorescent layer which is the same as that of the impressed said fluorescence-producing radiation.

13. A high resolution fluorescent display element in accordance with claim 1 in which said fluorescent emission is adapted to be viewed from the side of said fluorescent layer opposite to that of the impressed said fluorescence-producing radiation.

14. A high resolution fluorescent display element in accordance with claim 1 in which said fluorescent layer is a bi-color layer adapted to provide a stereoscopic anaglyphic image.

15. A high resolution fluorescent display element in accordance with claim 1 in which said fluorescent layer is a tri-color layer adapted to provide an additive three-color image.

16. A high resolution fluorescent display element comprising a substrate coated on each side with a fluorescent layer responsive to optical images of fluorescence-producing radiation, each of said fluorescent layers comprising a carrier for a fluorescent sensitizer and at least one fluorescent sensitizer dissolved in said carrier, said sensitizer being selectively used singly and in combination and being present in each of said layers within the range of proportional concentrations of from at least about 15 grams per pint up to the limit of solubility of said sensitizer, whereby there is provided in each layer substantially complete absorption of said fluorescence-producing radiation, and conversion, and fluorescent emission, within a surface film thickness of said layers of less than about .1 millimeter.

17. A high resolution fluorescent display element in accordance with claim 16 in which a fluorescent layer on one side of said substrate has a fluorescent color which is different from that of the fluorescent layer on the other side of said substrate.

18. In the preparation of a high resolution fluorescent display element responsive to optical images of fluorescence-producing radiation, an impregnation method for a fluorescent sensitizer material which includes the steps of immersing a film of resinous carrier in a solvent containing the said fluorescent sensitizer dissolved therein, draining off excess sensitizer solution, and drying said film of resinous carrier, said sensitizer being selectively used singly and in combination and being present in said solvent within the range of proportional concentrations of from at least about 15 grams per pint up to the limit of solubility of said sensitizer, said solvent being adapted to allow the said dissolved sensitizer to diffuse into said film of resinous carrier without dissolving said film of resinous carrier whereby there is provided in said film substantially complete absorption of fluorescence-producing radiation, and conversion, and fluorescent emission, within a surface film thickness of said film of less than about .1 millimeter.

19. An impregnation method in accordance with claim 18 in which said film of resinous carrier is masked to allow said impregnation and said diffusion of said dissolved sensitizer to act on one side only of said film of resinous carrier.

References Cited by the Examiner

UNITED STATES PATENTS

| | | | |
|---|---|---|---|
| 2,475,529 | 7/1949 | Switzer | 250—71 |
| 2,733,216 | 1/1956 | Eichholz et al. | 250—71 X |
| 2,757,103 | 7/1956 | Briggs et al. | 250—80 X |
| 2,795,730 | 6/1957 | Fromm et al. | 250—80 X |
| 2,950,222 | 8/1960 | Hinson | 250—80 X |
| 2,953,530 | 9/1960 | Switzer | 250—71 X |
| 2,975,318 | 3/1961 | Nicoll | 250—80 X |

ARCHIE R. BORCHELT, *Primary Examiner.*